(12) United States Patent
Sanders

(10) Patent No.: US 7,615,720 B2
(45) Date of Patent: Nov. 10, 2009

(54) PILOT ARC CIRCUIT FOR A CONTACT START PLASMA TORCH

(75) Inventor: Nicholas A. Sanders, Norwich, VT (US)

(73) Assignee: Hypertherm, Inc., Hanover, NH (US)

( * ) Notice: Subject to any disclaimer, the term of this patent is extended or adjusted under 35 U.S.C. 154(b) by 239 days.

(21) Appl. No.: 11/518,856

(22) Filed: Sep. 11, 2006

(65) Prior Publication Data
US 2008/0083713 A1 Apr. 10, 2008

(51) Int. Cl.
*B23K 10/00* (2006.01)
(52) U.S. Cl. ............... 219/121.57; 219/121.59; 219/121.54; 219/121.39
(58) Field of Classification Search ............ 219/121.54, 219/121.57, 121.39, 121.48, 121.45, 74, 219/75, 121.59; 313/231.31, 231.41; 315/111.21
See application file for complete search history.

(56) References Cited

U.S. PATENT DOCUMENTS

| | | | |
|---|---|---|---|
| 4,370,539 A | 1/1983 | Garlanov | |
| 4,791,268 A * | 12/1988 | Sanders et al. | 219/121.57 |
| 5,225,658 A * | 7/1993 | Yamaguchi et al. | 219/121.57 |
| 5,416,297 A * | 5/1995 | Luo et al. | 219/121.57 |
| 5,660,745 A | 8/1997 | Naor | |
| 5,828,030 A | 10/1998 | Naor | |
| 5,886,315 A | 3/1999 | Lu et al. | |
| 5,900,169 A | 5/1999 | Borowy et al. | |
| 5,961,855 A | 10/1999 | Hewett et al. | |
| 6,054,670 A | 4/2000 | Naor | |
| 6,242,710 B1 | 6/2001 | Naor | |
| 6,350,960 B1 | 2/2002 | Norris | |
| 6,486,430 B2 | 11/2002 | Naor | |
| 6,703,581 B2 | 3/2004 | Jones et al. | |
| 6,815,632 B2 | 11/2004 | Dallavalle | |
| 6,881,921 B2 | 4/2005 | Horner-Richardson | |
| 6,903,301 B2 | 6/2005 | Jones et al. | |
| 2001/0037996 A1 | 11/2001 | Naor | |
| 2002/0117483 A1 | 8/2002 | Jones et al. | |
| 2002/0117484 A1 | 8/2002 | Jones et al. | |
| 2004/0149702 A1 | 8/2004 | Dallavalle | |
| 2004/0232118 A1 | 11/2004 | Horner-Richardson et al. | |

* cited by examiner

*Primary Examiner*—Mark H Paschall
(74) *Attorney, Agent, or Firm*—Proskauer Rose LLP

(57) ABSTRACT

A contact start plasma system is provided that includes a passive pilot arc circuit that decreases the size and cost of the system. The plasma arc system includes a torch body, an electrode having a longitudinally disposed axis and mounted in the body, a nozzle having a longitudinally disposed axis, the nozzle axis being disposed substantially collinearly with the electrode axis, a power supply coupled to the electrode, the nozzle and a workpiece, the power supply providing a current for operating the torch in a pilot arc mode and a transferred arc mode, a gas source coupled to the plasma chamber, the gas source providing gas for operating in a pilot arc mode and a transferred arc mode, and a passive pilot arc circuit coupled between the power supply and the nozzle, the passive pilot arc circuit controlling the operation of the torch in the pilot arc mode. Either the electrode or the nozzle can be translatable for blow-forward or blow-back mode of operation.

29 Claims, 2 Drawing Sheets

PILOT ARC CIRCUIT FOR A CONTACT START PLASMA TORCH

BACKGROUND

Plasma arc torches are widely used in the cutting of metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. The torch produces a plasma arc, which is a constricted ionized jet of a plasma gas with high temperature and high momentum. Gases used in the torch can be non-reactive or reactive (e.g. argon, nitrogen, oxygen or air).

In operation, a pilot arc is first generated between the electrode (cathode) and the nozzle (anode). The pilot arc ionizes gas passing through the nozzle exit orifice. After the ionized gas reduces the electrical resistance between the electrode and the workpiece sufficiently, the arc transfers from the nozzle to the workpiece. The torch may be operated in this transferred plasma arc mode, which is characterized by the conductive flow of ionized gas from the electrode to the workpiece, for the cutting of the workpiece.

SUMMARY

Contact starting is one known technique for generating the pilot arc in a plasma torch. Contact starting is advantageous because it does not require high frequency equipment and does not normally generate electromagnetic interference. Typical contact starting systems include pilot arc circuits having a means for supplying pilot arc current, a pilot arc resistor, a current sensor, and a pilot arc relay, or a combination thereof, for transferring current from a pilot arc mode to a transferred arc mode. These pilot arc circuits increase the system size and cost of production.

A contact start plasma arc torch is provided that includes a passive pilot arc circuit that decreases the size and cost of the torch. The plasma arc torch includes a torch body, an electrode having a longitudinally disposed axis and mounted in the body, a nozzle having a longitudinally disposed axis, the nozzle axis being disposed substantially collinearly with the electrode axis, a power supply coupled to the electrode, the nozzle and a workpiece, the power supply providing a current for operating the torch in a pilot arc mode and a transferred arc mode, and a pilot arc circuit coupled between the power supply and the nozzle, the pilot arc circuit controlling the operation of the torch in the pilot arc mode. Either the electrode or the nozzle can be translatable.

The pilot arc circuit can include a pilot capacitor and a pilot resistor. The pilot capacitor and pilot resistor can be coupled in series. The pilot capacitor can have a value ranging between 10 microfarads and 100,000 microfarads. The pilot resistor can have a value ranging between 0.1 ohms and 100 ohms. In some embodiments, the pilot arc circuit can include a pilot capacitor and a pilot variable resistor or a pilot capacitor and an inductor. The pilot arc circuit can further include a discharge circuit coupled in parallel to the pilot capacitor for the discharging the pilot capacitor. The discharge circuit can include a discharge resistor and a discharge relay.

A method for operating of a contact start plasma arc torch includes providing a contact start plasma arc torch having an electrode and a nozzle disposed in a torch body, supplying electrical power to the torch for operation in a pilot arc mode and a transferred arc mode, and disconnecting power to the pilot arc mode of the torch through a passive pilot arc circuit.

The pilot arc circuit disconnects when the pilot arc capacitor is charged or substantially charged. The power can be disconnected at a predetermined time, wherein the predetermined time can be determined by an RC time constant of the pilot arc circuit. The magnitude of a pilot arc current can also be determined by the RC time constant of the pilot arc circuit. The RC component values can be fixed or variable.

The method can further include removing electrical power to the torch and discharging the pilot arc capacitor through a discharge circuit. The discharge circuit can include a discharge resistor and a discharge relay.

There is also provided a contact start plasma arc torch including means for supplying electrical power to a contact start plasma arc torch for operation in a pilot arc mode and a transferred arc mode and means for disconnecting power to the pilot arc mode of the torch though a passive pilot arc circuit.

There is also provided a power source for a contact start plasma arc system including a power supply for supplying electrical power to a torch for operation in a pilot arc mode and a transferred arc mode and a passive pilot arc circuit for disconnecting power to the pilot arc mode.

Advantages of the contact start plasma arc torch include: a passive pilot arc starting circuit; automatically disconnecting the pilot arc circuit at a predetermined time; easily setting the magnitude of the pilot arc current; eliminating the need for current sensing and logic control of the pilot arc circuit; seamlessly transferring current from the pilot art circuit to the workpiece; and minimization of the components resulting in decreased production costs of the plasma torch.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
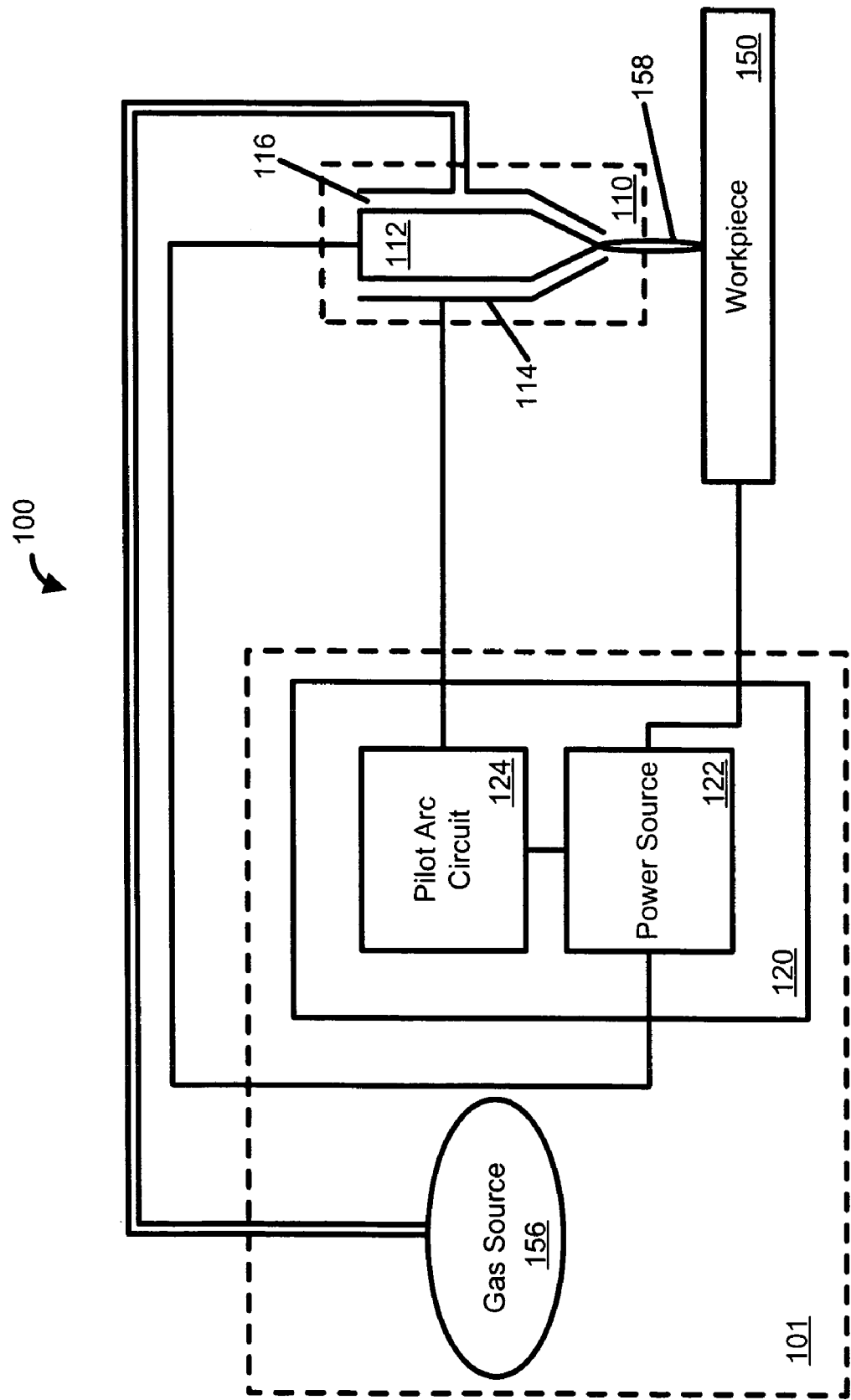
FIG. 1 is a block diagram of a contact start plasma arc torch.

FIG. 1 is a block diagram of a contact start plasma system 100 including a power and gas source 101 and a contact start torch body 110. Generally, the contact start plasma system 100 substantially eliminates the need for added circuitry to transfer between the pilot arc mode and the transferred arc mode. Typical added circuitry includes, but is not limited to, current sensing and logic control of the pilot arc circuit. The contact start plasma system 100 eliminated this need by utilizing a passive pilot arc circuit 124. The contact start plasma system 100 includes a torch body 110, a power supply 120, and a gas source 156. The torch body includes an electrode (cathode) 112 and a nozzle (anode) 114. The electrode 112 and the nozzle 114 are initially in contact with each other. The power supply 120 includes a power source 122 and a pilot arc starting circuit 124.

To start the torch 110, a low level electrical current is provided through the electrode 112 and abutting nozzle 114. Thereafter, a high pressure gas cylinder/source 156 provides gas to the plasma chamber 116. The gas has sufficient force to separate the electrode 112 and the nozzle 114. As the electrode 112 and the nozzle 114 separate, a pilot arc is created and the gas is ionized. The pilot arc is provided from the current flowing to the pilot arc starting circuit 124 from the power source 124 through the electrode 112 and the nozzle 114. As the separation distance increases, the ionized gas reduces the electrical resistance between the electrode and a workpiece 150 creating a low resistance current path for the transfer arc 158 between the electrode 112 and the workpiece 150. The transfer arc is provided from the current flowing from the power source 122 to the workpiece 150. At this point, the pilot arc is no longer needed and the current used to create the pilot arc can be switched to the transfer arc 158. As mentioned above, prior art torches use current sensing devices and switches or like devices to effectuate this transfer, thereby adding to the cost and the size of the overall system. Whereas, the pilot arc starting circuit 124 provides a seamless transfer of current through the use of a passive RC circuit. That is, as the capacitor in the RC circuit becomes more and more charged, the pilot current trends naturally toward zero and the pilot circuit behaves as if it were opened by a very high resistance value or a switch. Upon shutdown of the system 100, the flow of gas to plasma chamber 116 is terminated and the RC circuit is simultaneously dissipated, readying itself for the next starting sequence.

Figure 2:
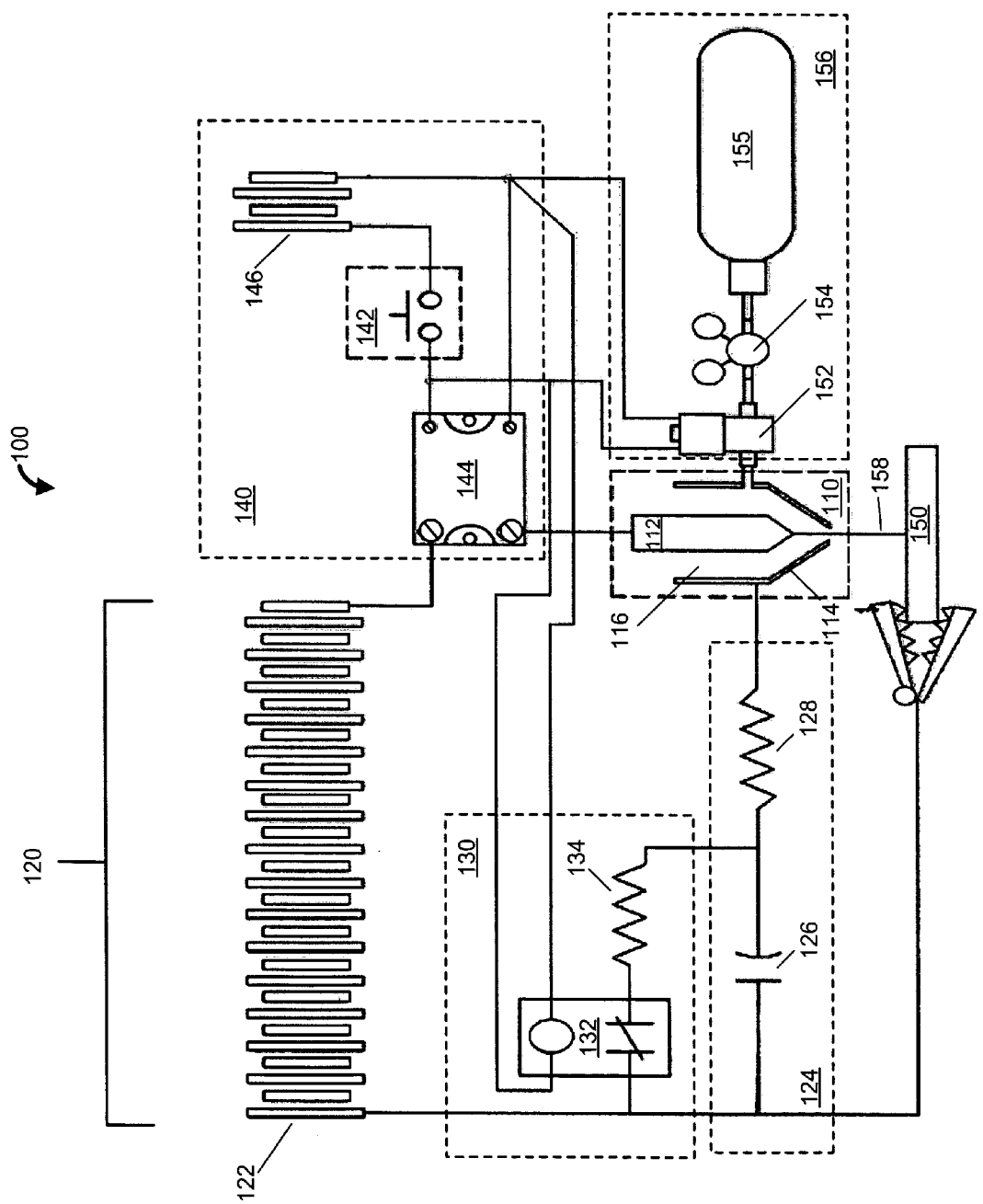
FIG. 2 is a detailed schematic diagram of the contact start plasma arc torch of FIG. 1.

FIG. 2 is a detailed schematic diagram of the contact start plasma system 100. The plasma system 100 includes a torch body 110, a power supply 120, and a gas source 156.

The torch body 110 includes an electrode 112, a nozzle 114, and an ignition circuit 140. The electrode 112 and the nozzle 114 are initially in contact with each other. The electrode 112 and a nozzle 114 can be configured as a blow-forward type or a blow-back type wherein the electrode 112 and the nozzle 114 move or translate with respect to each other or any type known in the art. The ignition circuit 140 includes a trigger 142, an ignition relay 144, and a power source 146. In some embodiments, the power source 146 can include a pair of twelve volt batteries connected in series; however any type of power source known in the art can be used.

The power supply 120 includes a power source 122, a pilot arc starting circuit 124, and a pilot arc discharge circuit 130. The power source 122 can include conditioning electronics for operation with external power sources or an energy storage device (e.g., a battery). In some embodiments, the power source 122 can include twelve to sixteen twelve volt batteries connected in series; however any type of power source known in the art can be used. The pilot arc starting circuit 124 includes a pilot arc capacitor 126 and a pilot arc resistor 128 coupled in series to form a passive RC circuit. The value of the pilot arc capacitor 126 can range between 10 microfarads and 100,000 microfarads. The value of the pilot arc resistor 128 can range between 0.1 ohms and 100 ohms. In some embodiments, the pilot arc capacitor 126 has a value of 18,000 microfarads and the pilot arc resistor 128 has a value of 5 ohms. The pilot arc discharge circuit 130 includes a pilot discharge relay 132 and a pilot discharge resistor 134. In some embodiments, the pilot discharge relay 132 is a normally closed relay, but can any type of relay known in the art. The value of the pilot discharge resistor 134 can range between 0.1 ohms and 100 ohms. In some embodiments, the pilot discharge resistor 134 has a value of 5 ohms.

The gas source includes a gas solenoid 152, a gas regulator 154, and a gas cylinder 155. The gas solenoid 152 allows gas to flow into the plasma chamber 116. The gas regulator 154 controls the amount of gas pressure flowing into the plasma chamber 116. The gas cylinder 155 contains the type of gas to be used.

To start the torch 110, the torch trigger 142 is closed; thereby opening the pilot discharge relay 132 and closing the ignition relay 144. The closure results in voltage and current flowing from the power source 122 through electrode 112 to the nozzle 114. Further, the resulting closure energizes a gas solenoid 152 allowing gas to flow into the plasma chamber 116. When the gas pressure in the plasma chamber 116 has risen to a predetermined value either the electrode 112 or the nozzle 114 begins to move/translate. The gas pressure can be set by a gas regulator 154. In some embodiments, the gas pressure is set to 60 psi. In some embodiments, high pressure air is contained in a high pressure gas cylinder 155; however any type of reactive or non-reactive pressurized gas can be used. In some embodiments, the gas cylinder 155 can be a fiber wound high pressure air cylinder. In some embodiments, the gas cylinder 155 is charged to 4500 psi with a volume of 92 cubic inches.

Pilot/starting current also flows concurrently to the pilot arc capacitor 126 through the pilot arc resistor 128. The pilot arc capacitor 126 charging current creates a pilot arc that ionizes the gas as the gas pressure in the plasma chamber 116 separates the electrode 112 and the nozzle 114. The magnitude of the pilot arc capacitor 126 charging current and the length of time the current will flow is determined by the RC time constant of the pilot arc circuit 124. The pilot/starting current enables the pilot arc capacitor 126 to begin to charge (i.e., store energy). In some embodiments, the pilot arc capacitor 126 is partially charged before separation of the electrode 112 and the nozzle 114 and continues to charge as the pilot arc forms.

The pilot arc formed between the electrode 112 and nozzle 114 creates an ionized electrical path to the workpiece 150 resulting in the flow of main cutting current (transfer arc) 158 to the workpiece 150. In some embodiments, the main cutting current (transfer arc) 158 and voltage ramp up to their maximum operating values over several tens of milliseconds. The pilot current continues to charge the pilot arc capacitor 126 at a continually decreasing rate until the capacitor 126 becomes essentially fully charged. The amount of charge time required to fully charge the capacitor is determined only by the RC time constant. At this point, the pilot arc circuit 124 naturally opens and the pilot current stops flowing through the pilot circuit 124 and only the main cutting current (transfer arc) 158 flows to the workpiece 150. Thus, the passive pilot arc circuit 124 provides a seamless/automatic/natural transfer of current to the workpiece 150.

To turnoff the system 103, the trigger 142 is released opening the ignition relay 144 and closing the discharge relay 132 of the discharge circuit 130. The closing of the discharge relay 132 allows the pilot arc capacitor 126 to discharge through the pilot discharge resistor 134. The plasma system 103 is now ready to be restarted. In some embodiments, such as plasma torches started manually via a hand operated trigger, the discharge relay 132 can be replaced with a "double-pole double-throw" switch type trigger, wherein the circuit is discharged upon release of the trigger.

The magnitude of the current flow to the workpiece 150 is determined by the current output capacity of the power source 122 and the electrical characteristics of the transferred plasma arc. Some factors contributing to controlling the current output capacity of the torch, alone or in combination, include a) consumable design that determines operating plasma arc voltage and the resistive character of the plasma arc; b) overall cutting circuit electrical resistance; c) state of battery charge; and d) battery open circuit voltage. It should be understood by in skilled in the art that other factors may also be considered.

While this invention has been particularly shown and described with references to preferred embodiments thereof, it will be understood by those skilled in the art that various changes in form and details may be made therein without departing from the scope of the invention encompassed by the appended claims.

What is claimed is:

1. A contact start plasma arc system, comprising:
   a torch body;
   an electrode having a longitudinally disposed axis and mounted in the body;
   a nozzle having a longitudinally disposed axis, the nozzle axis being disposed substantially collinearly with the electrode axis;
   a power supply coupled to the electrode, the nozzle and a workpiece, the power supply providing a current for operating the torch in a pilot arc mode and a transferred arc mode; and
   a passive pilot arc circuit coupled between the power supply and the nozzle, wherein the pilot arc circuit controls the operation of the torch in the pilot arc mode and automatically disconnects power to the pilot arc mode to facilitate an automatic transfer from the pilot arc mode to the transferred arc mode by reducing a pilot current towards zero as a pilot capacitor in the pilot arc circuit becomes more charged, such that the pilot arc circuit opens and the pilot current stops flowing through the pilot arc circuit when the pilot capacitor becomes essentially fully charged.

2. The system of claim 1, wherein the pilot arc circuit includes a pilot resistor.

3. The system of claim 2, wherein the pilot capacitor and pilot resistor are coupled in series.

4. The system of claim 2, wherein the pilot capacitor has a value ranging between 10 microfarads and 100,000 microfarads.

5. The system of claim 4, wherein the pilot capacitor has a value of 18,000 microfarads.

6. The system of claim 2, wherein the pilot resistor has a value ranging between 0.1 ohms and 100 ohms.

7. The system of claim 6, wherein the resistor has a value of 5 ohms.

8. The system of claim 2, further including a discharge circuit coupled in parallel to the pilot capacitor for the discharging the pilot capacitor.

9. The system of claim 8, wherein the discharge circuit includes a discharge resistor and a discharge relay.

10. The system of claim 8, wherein the discharge circuit includes a discharge resistor and a double-pole double-throw trigger switch.

11. The system of claim 1, wherein either electrode or the nozzle is translatable.

12. The system of claim 1, wherein the automatic transfer occurs at a predetermined time.

13. The system of claim 12, wherein the predetermined time is determined from an RC time constant of the passive pilot arc circuit.

14. The system of claim 1, further including a gas source coupled to the plasma chamber.

15. A method for operating of a contact start plasma system, comprising:
   providing a contact start plasma arc torch having an electrode and a nozzle disposed in a torch body;
   supplying electrical power to the torch for operation in a pilot arc mode and a transferred arc mode;
   charging a pilot capacitor of a passive pilot arc circuit; and
   automatically disconnecting power to the pilot arc mode of the torch through the passive pilot arc circuit to facilitate an automatic transfer from the pilot arc mode to the transferred arc mode by reducing a pilot arc current towards zero as the pilot capacitor in the pilot arc circuit becomes more charged, such that the pilot arc circuit opens and the pilot current stops flowing through the pilot arc circuit when the pilot capacitor becomes essentially fully charged.

16. The method of claim 15, wherein power to the pilot arc mode is naturally disconnected at a predetermined time.

17. The method of claim 16, wherein the predetermined time is determined by an RC time constant of the passive pilot arc circuit.

18. The method of claim 15, wherein a magnitude of the pilot arc current is determined by an RC time constant of the pilot arc circuit.

19. The method of claim 15, wherein the pilot arc circuit includes a pilot resistor.

20. The method of claim 19, wherein the pilot capacitor and pilot resistor are coupled in series.

21. The method of claim 15, further including:
   removing electrical power to the torch; and
   discharging the pilot arc capacitor through a discharge circuit.

22. The method of claim 21, wherein the discharge circuit includes a discharge resistor and a discharge relay.

23. The method of claim 21, wherein the discharge circuit includes a discharge resistor and a double-pole double-throw trigger switch.

24. The method of claim 15, wherein disconnecting power to the pilot arc mode results in a seamless transfer of current to a workpiece.

25. The method of claim 15, wherein either electrode or the nozzle is translatable.

26. The method of claim 15, further including supplying gas to the torch for operation in the pilot arc mode and the transferred arc mode.

27. A contact start plasma system, comprising:
   means for supplying electrical power to a contact start plasma arc torch for operation in a pilot arc mode and a transferred arc mode; and
   means for automatically disconnecting power to the pilot arc mode of the torch though a passive pilot arc circuit to facilitate an automatic transfer from the pilot arc mode to the transferred arc mode by reducing a pilot current towards zero as a pilot capacitor in the pilot arc circuit becomes more charged, such that the pilot arc circuit opens and the pilot current stops flowing through the pilot arc circuit when the pilot capacitor becomes essentially fully charged.

28. The system of claim 27, further including means for supplying gas to the contact start plasma arc torch for operation in the pilot arc mode and the transferred arc mode.

29. A power source for a contact start plasma arc system, comprising:
   a power supply for supplying electrical power to a torch for operation in a pilot arc mode and a transferred arc mode; and
   a passive pilot arc circuit for automatically disconnecting power to the pilot arc mode, the passive pilot arc circuit comprising a pilot capacitor that automatically disconnects the pilot arc circuit to facilitate an automatic transfer from the pilot arc mode to the transferred arc mode by reducing a pilot current towards zero as the pilot capacitor in the pilot arc circuit becomes more charged, such that the pilot arc circuit opens and the pilot current stops flowing through the pilot arc circuit when the pilot capacitor becomes essentially fully charged.

* * * * *

UNITED STATES PATENT AND TRADEMARK OFFICE
CERTIFICATE OF CORRECTION

| | | |
|---|---|---|
| PATENT NO. | : 7,615,720 B2 | Page 1 of 1 |
| APPLICATION NO. | : 11/518856 | |
| DATED | : November 10, 2009 | |
| INVENTOR(S) | : Nicholas A. Sanders | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 299 days.

Signed and Sealed this

Nineteenth Day of October, 2010

David J. Kappos
*Director of the United States Patent and Trademark Office*